March 29, 1960 S. TESZNER 2,930,950

HIGH POWER FIELD-EFFECT TRANSISTOR

Filed Dec. 9, 1957 3 Sheets-Sheet 1

STANISLAS TESZNER
INVENTOR

By A. A. SAFFITZ
Attorney

HIGH POWER FIELD-EFFECT TRANSISTOR

Filed Dec. 9, 1957 3 Sheets-Sheet 2

STANISLAS TESZNER
Inventor
By A. A. SAFFITZ
Attorney

STANISLAS TESZNER
INVENTOR
By: A.A. SAFFITZ
Attorney

United States Patent Office 2,930,950

Patented Mar. 29, 1960

2,930,950

HIGH POWER FIELD-EFFECT TRANSISTOR

Stanislas Teszner, Paris, France

Application December 9, 1957, Serial No. 701,670

Claims priority, application France December 10, 1956

11 Claims. (Cl. 317—235)

The present invention concerns a high power field-effect transistor.

There has been described, in the specification of my co-pending U.S. patent application Ser. No. 565,231, filed on February 13, 1956, a field-effect transistor comprising two electrodes situated at the ends of a rod of semi-conductive material and an intermediate electrode called "gate electrode" surrounding a conductive channel inside the said rod and ensuring the modulation of the cross-section of the channel by means of an electric field, and characterized essentially by the fact that the said channel has a cylindrical shape, the gate electrode being annular and the conductive channel thus being subjected to a centripetal pinch-off effect.

This essential feature of the device procures numerous advantages which have been set forth in the specification of my aforesaid co-pending application. The construction of such a device is relatively easy; this device is especially useful for ensuring an amplification of high-frequency signals and it lends itself particularly well to an adaptation, the object of which is to extend the range of frequencies of operation as an amplifier up to centimetric waves by providing a plurality of electrodes, at least one producing a bias-like pinch-off of the channel and another single electrode producing a modulated pinch-off of the channel according to an input signal.

On the other hand, the dissipating power of this device is relatively low and hardly exceeds 90 to 100 milliwatts per rod unless complications, due to a difficult construction, be encountered such as the addition of a cooling fin directly to the annular electrode. The anode current is generally of the order of 1 to 3 milliamperes with saturation voltages of the order of 30 to 90 volts. The transconductance of such a device, which is quite similar to a pentode valve, is, at most, of the order of 0.4 to 0.5 milliampere per volt; this practically prevents its application to the construction of amplifiers having a wide pass-band for frequencies substantially exceeding 1 megacycle per second.

In order to obtain higher dissipating powers as well as higher transconductances, without affecting the cut-off frequency, it is possible to connect the rods in parallel. This possibility is real owing to the remarkable regularity of the characteristics of the devices thus constructed, the anode currents not differing, from one sample to another, by more than 20%. However, it is troublesome to take advantage of this possibility and relatively expensive sets result from it. On the other hand, it is hardly practicable to exceed the number of about ten rods in parallel, the total dissipating power remaining less than 1 watt.

The object of the present invention is to construct, in a simple and economical manner, starting from the basic principle set forth in the specification of my aforesaid application, devices which are capable of ensuring an amplification of relatively high powers, with dissipating powers of from 1 watt to 1 kilowatt and even more, transconductances of from a few milliamperes per volt to an order of magnitude of some amperes per volt and cut-off frequencies of several tens of megacycles per second.

The invention consists essentially in forming, in a slice of semi-conductive material, a plurality of rods, in parallel, which are distinct but are integral with and keep a common base in the slice, the gate electrode also being common to all the rods and each of the rods nevertheless constituting an individual field-effect transistor.

Such a construction is here attended by advantages resulting from the cylindrical configuration of the conductive channel, namely that, for the same transverse dimension, the minimum voltage $V_0$ to be applied to the gate in order to obtain a complete pinch-off of the channel is twice as low as in the case of a parallelepipedal configuration. Consequently, the maximum transverse dimension for which the complete pinch-off is ensured under a given voltage is here $\sqrt{2}$ times as great, in accordance with the following equations:

In the case of a cylindrical rod:

$$V_0 \text{ volts} = \frac{3\pi 10^2 qnR^2}{K} \qquad (1)$$

with $q=4.8\ 10^{-10}$ u.c.g.s., $n$ being the numbers of unbalanced donors or acceptors per cubic centimetre ($K=16$ for germanium and 12 for silicon) and R the radius of the cylinder in centimetres.

In the case of a parallelepipedal rod:

$$V_0 \text{ volts} = \frac{6\pi 10^2 qna^2}{K} \qquad (2)$$

$a$ being half the thickness of the parallelepiped in centimetres.

As, on the other hand, it is possible to obtain surface barriers which easily withstand 200 volts in the reverse direction, it follows that the diameter of each rod may be relatively great. This indisputably facilitates the construction and ensures the robustness that is desired of the device.

It is thus, for example, that, for germanium of a resistivity $\rho=25$ ohm-cms. (for the N-type, the number $n$ of unbalanced donors being $5.10^{13}/\text{cm.}^3$), the diameter of each rod may be 0.125 mm., the corresponding voltage $V_0$ of complete pinch-off being 60 volts.

In order to increase the cut-off frequency and the merit factor defined by the ratio $S/C$ where S is the transconductance and C is the capacity of the gate electrode with respect to the conductive channel, it is necessary to reduce the capacity C and, to this purpose, provision is made for forming, at the middle of the rods, a neck in which the gate electrodes are located.

The invention will be better understood and its advantages better appreciated by referring to the following detailed description as well as to the accompanying drawings, in which.

Figure 8:
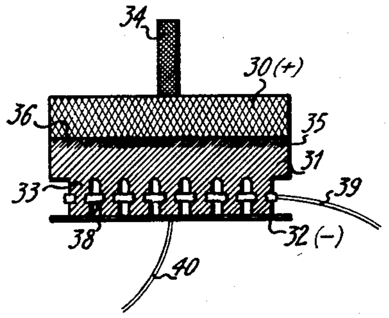
Figure 9:
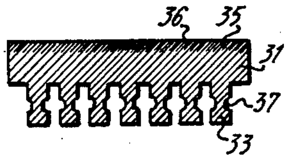
Figure 10:
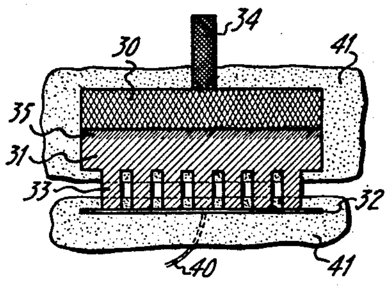

Figs. 8, 9 and 10 relate to a power field-effect transistor, the rods of which each possess a neck and a common gate electrode in all the necks.

In all the figures, identical parts are denoted by the same reference numerals.

The power field-effect transistor comprises (Figs. 1 and 2) a thin slice 1 of a given semi-conductive body of the desired resistivity. The slice has, for example, an area of 2 sq. cms. and a thickness of 0.25 mm. It is plane and carefully polished.

The slice forms a base and is provided, on one side, with cylindrical rods or teeth 2 which are perpendicular to its surface and the method of obtaining which will be described hereinafter (for the sake of clearness of the drawing, the height of the rods represented has been intentionally exaggerated and their profile idealized). These rods are arranged regularly, for example in concentric circles if the slice 1 is circular or in the manner of a quincunx if the slice is square or rectangular, or in a mixed arrangement, at a maximum density, represented, by way of example, in Fig. 1. The set consisting of the base and the teeth has the appearance of a brush. Situated at the end of each tooth is an ohmic contact 3 and, situated on the plane face of the slice and in the axis of each tooth, is a second ohmic contact 4. These ohmic contacts constitute the source electrode and the drain electrode of each individual field-effect transistor. The hollows of the teeth are filled with a continuous metallic layer 5 which constitutes the gate electrode of the different rods. In the case of Fig. 2, the gate electrode is arranged directly on each rod; in the case of Fig. 3 (a partial view represented on a large scale), it is arranged on an insulating film 6.

The diameter of these rods 2 is determined essentially, for a given semi-conductor, by the two following considerations:

(*a*) To permit a complete pinch-off for the minimum biasing voltage which can normally be applied (in connection with this, see Formula 1);

(*b*) To avoid the risk of starting of an avalanche of carriers in the radial direction or of their spontaneous formation by the effect called the Zener effect. This diameter is thus a function of the density of the charge-carriers, of the dielectric constant of the semi-conductor, of the maximum electric field admissible for this semi-conductor and of the service voltage chosen. It is therefore seen that this diameter may vary within wide limits according to the particular case; it is, for example, normally, for germanium, between 0.05 and 0.2 mm. without the interposition of an insulating film (Fig. 2) and may even exceed 0.5 mm. with the interposition of an insulating film (Fig. 3); for silicon, the upper limit may be above 1 mm. The useful length (covered by the gate electrode 5) is, for a given semi-conductor, chiefly a function of the service voltage chosen. It is, for example, normally between 0.1 and 0.5 mm. for germanium and may exceed the latter limit appreciably for silicon.

One of the methods of manufacture of the high power field-effect transistor according to the invention is the following:

The semi-conductive, flat and polished slice 1, which has been prepared by the usual means, is provided, on its lateral wall and on its two faces, with masks, those applied to the two faces having small orifices near the axes of the rods 2 to be formed. There is then diffused, at a high temperature, through these small orifices, a doping agent, preferably in the gaseous state, for example phosphorus, antimony or arsenic for germanium or silicon of the N-type, and boron, aluminium or indium for germanium or silicon of the P-type. A process for gaseous diffusion, in vacuo, of impurities in slice of germanium is described, for example, in the article "A High Frequency Diffused Base Germanium Transistor," by Charles A. Lee, which appeared in "The Bell System Technical Journal," January 1956, vol. XXXV, page 25. The diffusion of the impurity in germanium through the orifice of the masks forms, on the two faces of the slice, heavily doped "darts" 3 and 4 having a conductivity of several orders of magnitude greater than that of the base semi-conductor. These darts penetrate to a small depth which is fixed by regulating the time of diffusion and which is chosen so that the distance between their opposite ends is slightly greater than the useful length of the rods, that is to say than the length of the gate. For example, for a slice having a thickness of 0.25 mm. and the useful length of the rods being 0.15 mm., there is given a depth of penetration, by the darts, of a little less than 0.05 mm.

Figure 1:
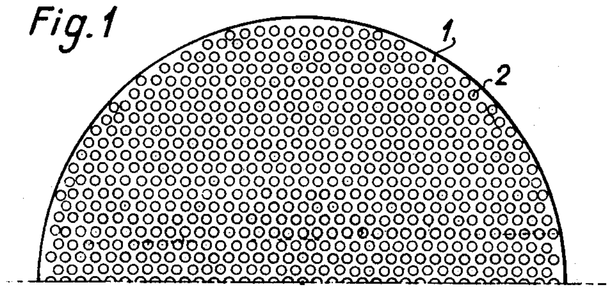
Figs. 1 and 2 represent, in plane and in diametral section respectively, a power field-effect transistor, according to the invention, with cylindrical rods.
Figure 2:

The outer surfaces of the darts are then metal-plated and these metal-plated parts constitute ohmic contacts which will subsequently be connected in parallel to the source and drain electrodes of the transistor. The metal-plated surfaces of the darts are then coated with a varnish, for example a cellulose varnish, through the mask already used. The size of the orifices of the masks through which the varnish is applied should be equal to the diameter of the rods and it may be greater than the size of the orifices of the first mask used for the diffusion of the impurity and for the metal-plating. Of course, the centres of the two masks should coincide. An electrolytic etching treatment is then applied to the desired face of the slice. The etching process tested by the applicant is the following:

The face not to be hollowed is provided with a flat counter-electrode, which gives the counter-image of the profile to be obtained; the plan view of such an electrode is given in Fig. 1, with the difference that 2 here represents the orifices in the electrode and not the rods. This electrode and this face, as well as the circumference, are covered with a mask of insulating material which is unattackable by the electrolyte employed. The slice, which is provided, on one side, with the electrode and, on the other, is protected by washers made of varnish and situated at the positions of the rods to be made, is immersed in an electrolytic bath which may, for example, be constituted by a sulphuric-acid solution having a strength of 0.1 to 0.01 normal or by a caustic-potash solution having a strength of 0.1 normal. The regular formation of the rods may be favoured by illuminating the face to be hollowed by rays of light directed perpendicularly thereto and filtered so as to allow to pass through only rays having a wavelength such that they are absorbed by the surface of the bottom of the hollows being formed.

The development of this etching operation is controlled by the variation of the resistance of the sample treated, which resistance diminishes gradually. The operation is stopped automatically at a given resistence value which corresponds to a given length of the rods.

The washers made of varnish, which are situated on the flat face after the insulating mask is removed, and those situated at the ends of the rods are then dissolved in order to disengage the metal-plated parts; in the same way, the mask made of insulating material is dissolved.

Figure 3:
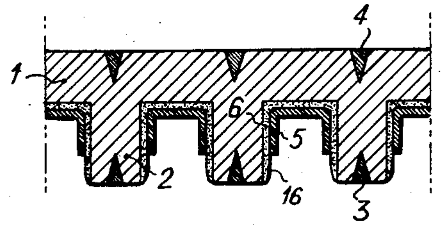
Fig. 3 is a modification in which the gate electrodes are applied against the rods, with the interposition of an insulating layer.

If the gate electrode has to be applied with the interposition of an insulating film 6, as in the case of Fig. 3, a film having, for example, a thickness of 0.1 mm. is applied, for example by vaporization, to the bottom of the hollows and to the side wall of the rods. The said varnish is, preferably, a varnish which is resistant to a relatively high temperature, for example a silicone varnish. A layer of a metal, for example, aluminium or Wood's alloy, is then applied by evaporation in vacuo, and forms the gate electrode, care being taken, in the meantime, to leave at the end of the rods a suitable length 16 of insulator along the insulating film. Alternatively, the coating of aluminium is cleared away, in the vicinity of the ends of the rods, after the operation of evaporation in vacuo.

Figure 4:
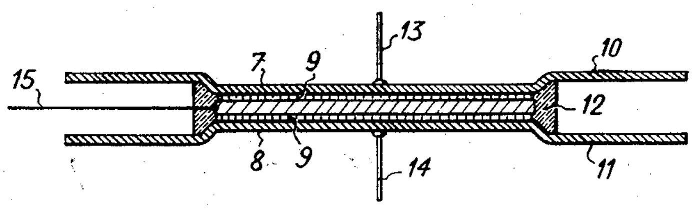
Fig. 4 represents the power field-effect transistor provided with its electrodes and cooling fins.

Once the slice has been finished, it is covered by, for example (Fig. 4), two electrodes which are conductive plates 7 and 8 of bronze or nickel for example, having a multitude of points 9 which coincide with the metal-plated darts 3 and 4 and are welded to the latter. These electrodes comprise lateral fins 10 and 11. The set comprising the high power field-effect transistor and the finned electrodes is encased in an insulating mass 12, for example in polyethylene, polyvinyl chloride or epoxy resin. A source-electrode connection 13, a drain-electrode connection 14 and a gate-electrode connection 15 are welded respectively to the electrodes 7 and 8 and to the layer of aluminium 5.

If the rods of the transistor are not covered by an insulating film, the gate electrode 5 is arranged on the germanium in the following manner:

An electroplated layer is made on the rods 2 after the etching treatment. For this purpose, there is used an acid bath comprising a salt of the metal which it is desired to deposit, for example a solution of indium sulphate $In_2(SO_4)_3$ in the proportion of 25 grammes of the latter per litre of water, with the addition of $H_2SO_4$ giving a resulting pH value of about 2.5. It is then sufficient, after the etching operation, to replace the used bath by the electroplating bath and to reverse the direction of the electrolysis current. The same bath may still more simply be used for the etching and the electroplating by reversing the direction of the current between the two operations. After the electroplating operation, the ends of the rods are cleared away in a dilute acid so as to limit the metallic layer, which forms the gate electrode, on this side of the heavily doped darts.

In the foregoing, it has been assumed that the rods are formed by the electrolytic etching operation. It is also possible to form the rods by a process that utilizes ultrasonic vibrations. For this purpose, the germanium slice to be treated, as well as a metallic piece or stamp, which is pierced with orifices and has the shape of the counter-electrode used in the preceding process (that is to say, the holes of the stamp correspond to the rods to be made) and is of a thickness that is at least equal to the length of the rods to be formed, are placed in an ultrasonic vibration apparatus. The slice is stationary and the stamp is connected to the vibrating part of the apparatus, or vice versa. The slice is placed against the stamp, the whole is immersed in an abrasive solution and the apparatus is started. The slice is consumed in the spaces between the orifices and the rods are formed in front of the orifices.

It has hereinbefore been assumed that strictly ohmic contacts are secured at the two ends of the rods in order to render the transistor absolutely symmetrical, thus widening the range of its applications. In the case of Figs. 2 and 3, the contacts 4 on the base 1 are separated from one another in order to reduce the parasitic capacity to a minimum in the case in which the base should constitute the drain and to eliminate the risks of clicking between the gate and the base. It is, in fact, the output capacity (capacity between gate and drain) which is the most troublesome in the operation of the transistor. However, for usual applications, in which the base always has to constitute the same electrode, namely the source electrode it is no longer necessary that the contact between the base semi-conductor and the electrode should be strictly ohmic and, on the other hand, it may be common to all the rods. Thus, the source electrode may be formed as represented in Fig. 5 (partial view on a large scale) by a metallic plate 17 welded to the semiconductive slice 1, without any heavier doping, the drain electrode being formed by a metallic sheet of tinsel **17*a* which is welded to the heavily doped ends 3** of the rods.

In the foregoing, the rods, are, in fact, formed projecting from the slice. It is possible (Fig. 6) to form the rods inside the slice of germanium by diffusing, through a suitable mask, vaporized impurities which give to germanium a type of conductivity that is opposite to that of the slice. This diffusion produces the gate electrode 18 of a single holder and thus bounds the rods. The gate voltage, instead of being applied through the barrier layer existing between a metal and the semi-conductive body, is here applied through a junction between two semi-conductive bodies of opposite types. The heavily doped darts are formed, for example, solely on the base 1, as represented in Fig. 6 (darts 4) or also at the other end of the rods.

Figure 7:
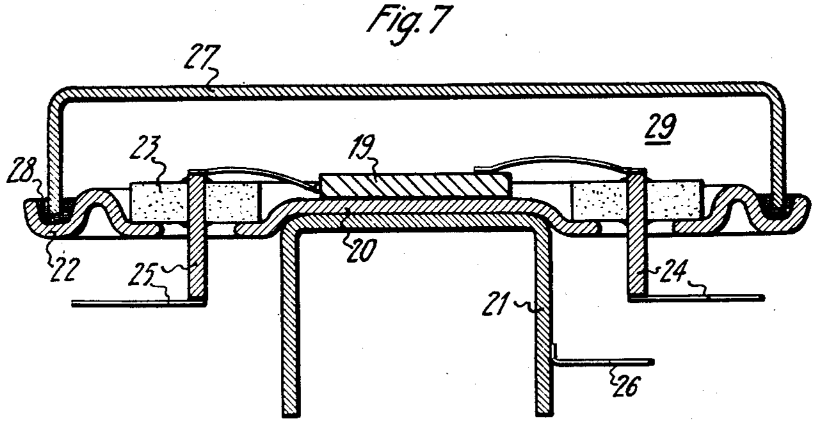
Fig. 7 is a power field-effect transistor situated inside a frame.

Fig. 7 represents the high power field-effect transistor situated inside a frame. 19 is the transistor. It is welded on to a flat metallic disc 20, on to the other face of which a cooling fin 21 is welded. The disc 20 is connected to a circular metallic ring 22 by a sintered glass rim 23 through which pass a metallic terminal 24, which is connected to an end electrode (for example **17*a* of Fig. 5), and a metallic terminal 25 which is connected to the gate electrode 5. The second end electrode is connected to the fin 21 on which a connection 26 is welded. A metallic hood 27 is fixed to the ring 22 by solder 28. After soldering, the vacuum is made, through an orifice (not shown) in the hood 27, in the enclosure 29**. The latter is filled with an inert gas and, finally, the filling orifice is closed (for example with solder).

Figure 5:
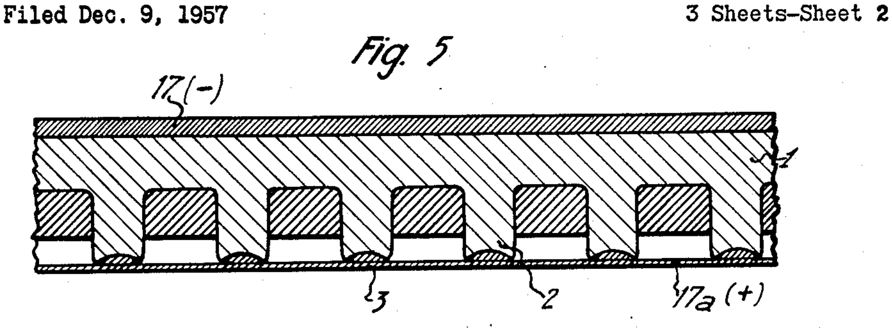
Fig. 5 is a second simplified modification of a power field-effect transistor, which is useful in certain applications.
Figure 6:
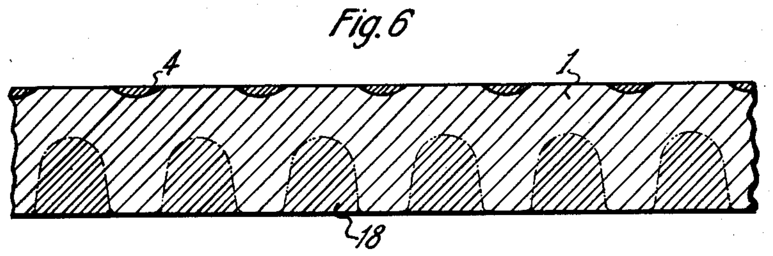
Fig. 6 is a third modification, in which the rods do not project out of the base, the gate electrode being formed by diffusion of a doping agent.

In Figs. 3, 5 and 6, the rods are cylindrical and the annular gate electrode surrounds the cylindrical part. This arrangement renders it possible to construct high power field-effect transistors for amplifying signals having frequencies of up to about 1 megacycle per second. However, for higher frequencies, the input capacity and the output capacity of the transistor become troublesome.

In order to diminish these capacities as much as possible and obtain a high merit factor $S/C$ ($S$=transconductance of the transistor, $C$=capacity of the gate electrode in relation to the conductive channel) of the order of, at least, $10^9$, provision is made for placing the single gate electrode around narrowed parts or necks of the rods.

The transistor of Figs. 8 and 9 comprises two end electrodes, one of which is formed by a metallic plate 30 welded on the smooth face of the base 31 and the other of which is formed by a sheet of tinsel 32 welded on the free ends of the rods 33. The electrode 30 is provided with a shank 34 which serves for welding a connection wire and also as an axis of rotation in the operation of depositing the gate electrode. The electrode 32 is provided with a connection 40.

The electrode 30 is the drain electrode and the electrode 32 is the source electrode. It has been seen that, in the case of Fig. 5, the contact had to be strictly ohmic on the drain side and that it was unnecessary that it should be strictly ohmic on the side of the source electrode and that the drain side was heavily doped in order to obtain a strictly ohmic contact. In the case of Fig. 8, the plane side 36 of the base 3, which is to receive the drain electrode 30 is heavily doped at 35.

It is seen, in Figs. 8 and 9, that each rod 33 comprises a neck 37 at a portion of its height. These necks 37 are covered by a metallic deposit 38, of indium for example, which fills the whole space between adjacent rods. This deposit forms the gate electrode, to which a connection 39 is soldered. As the gate electrode is limited to the necks, the capacity of this electrode in relation to the electrodes 30 and 32 is considerably reduced in relation to the cases of Figs. 3, 5 and 6.

The manufacture of the transistor shown in Figs. 8 and 9 is carried out as follows:

A slice is taken having, for example, the same area (2 sq. cms.) and the same thickness (0.25 mm.) as before. The face 36, for example, is heavily doped by gaseous diffusion and it is metal-plated, but, differently from the case of Fig. 2, it is not partially covered by a mask during the diffusion and metal-plating operations. The teeth 33 are formed by the process hereinbefore described that makes use of ultrasonic vibrations and the free ends of the teeth are metal-plated.

Having done this, the electrodes 30 and 32 are soldered, preferably in an oven having a non-oxidizing atmosphere.

The covering of the "rods," provided with their electrodes, with a varnish 41, for example a cellulose varnish, is then proceeded with, leaving uncovered, as shown in Fig. 10, only the portion of the rods at which the neck is to be formed, over about 0.2 mm., as well as the ends of the shank 34 and of the connection 40. After this, the element is immersed in a circulating electrolytic solution, where it is adapted to be driven with a rotation movement round the shank 34. The electrolyte may consist of a very dilute solution of $H_2SO_4$ (0.05 normal) or an acid solution of indium sulphate $In_2(SO_4)_3$ of a pH value of 2.3. In the latter case, the solution may also be used for producing the deposit of indium; it is this modification that will be described.

The connections 34 and 40 of the two end electrodes are connected to the positive pole of a current source. On the other hand, an electrode connected to the negative pole is immersed in the electrolyte, placing it sufficiently far from the element in order that all the rods should be attacked uniformly. The etching operation is then carried out and its course is controlled as has been described in the specification of my previous application.

By way of indication, assuming that the rods have a diameter of 0.3 mm. the depth of the neck 37 may be of the order of 0.1 mm.

When the etching has been ended, the direction of the current is reversed so as to proceed to the deposition of indium until the spaces between the necks are filled.

The operation is followed by the soldering of the connection 39, by the uncovering of the element (by dissolving the covering in acetone, if the covering is a cellulose varnish) and, finally, by electrolytic cleaning by the usual processes.

Although the invention has been described in connection with a concrete embodiment, it is to be understood that modifications, which can easily be devised by a person skilled in the art, are possible and that these modifications are within the scope of the invention. By way of example, there has been described the production of ohmic contacts with the aid of a heavy doping of the semi-conductor and of a tinning of the heavily doped parts. Of course, there could be employed for the production of the ohmic contacts the method which consists in vaporizing, at the position of the contacts, a suitable alloy, for example an antimony alloy, at the temperature of the eutectic point of one of the constituents of the alloy with germanium.

In the same way, in addition to germanium and silicon of the N and P types, other semi-conductors, such as the inter-metallic compounds of groups III and V of the periodic classification may be employed for making the high power field-effect transistor according to the invention.

What I claim is:

1. A high power field-effect transistor comprising a semi-conductive base having a plane face, a plurality of semi-conductive cylindrical rods extending perpendicularly from said base and integral therewith, a first electrode having at least one ohmic contact with said base, a second electrode having ohmic contacts with all the ends of the rods, and a gate electrode constituted by a metallic layer deposited on the recesses between the rods and on the lateral wall thereof and having a rectifying contact therewith thereby providing as many individual field-effect transistors as there are rods projecting from the base, said transistors being connected in parallel between said first and second electrodes and providing cylindrical shaped channels being controlled in parallel by a common gate electrode.

2. A high power field-effect transistor comprising a semi-conductive base having a plane face, a plurality of semi-conductive cylindrical rods extending perpendicularly from said base and integral therewith, a first electrode having at least one ohmic contact with said base, a second electrode having ohmic contacts with all the ends of the rods, an insulating film deposited on the recesses between the rods and on the lateral wall thereof and a gate electrode constituted by an evaporated metallic layer deposited over said film.

3. A high power field-effect transistor comprising a semi-conductive base having a plane face, a plurality of first heavily doped regions in said plane face, an equal plurality of semi-conductive cylindrical rods extending perpendicularly from said base and integral therewith, a plurality of second heavily doped regions at the ends of said rods, a first electrode having ohmic contacts with all the first heavily doped regions, a second electrode having ohmic contacts with all the second heavily doped regions and a gate electrode constituted by a metallic layer deposited on the recesses between the rods and the lateral wall thereof and having a rectifying contact therewith.

4. A high power field-effect transistor comprising a semi-conductive base having a plane face, a plurality of semi-conductive cylindrical rods extending perpendicularly from said base and integral therewith, said rods having narrower portions at a level located in the middle of their length, a first electrode having at least one ohmic contact with said base, a second electrode having ohmic contacts with all the ends of the rods, and a gate electrode constituted by a metallic layer deposited around the rods at the level of said narrower portions and having a rectifying contact therewith.

5. A high power field-effect transistor comprising a semi-conductive base of relatively low conductivity in a given type having two plane parallel faces, in the first of said faces a first plurality of regions the conductivity of which is substantially increased in said given type, in the second of said faces a second plurality of regions the conductivity of which is similarly increased, said second regions being opposite to said first regions, a plurality of dart-shaped regions the conductivity of which is of the type opposite to the given type of said base, said dart-shaped regions being located between said second regions, extending inside said base and delimiting therein rod-shaped regions the conductivity of which is of the given type already present in said base, a first electrode having ohmic contacts with all said regions of said first face, a second electrode having ohmic contacts with all second rod-shaped regions and a gate electrode having ohmic contacts with all said dart-shaped regions, the rectifying contact between the gate electrode and the rod-shaped regions being constituted by the junction between said rod-shaped and dart-shaped regions having opposite types of conductivity.

6. A method of manufacturing high power field-effect transistors comprising covering the faces of a semi-conductive slice having parallel faces with a first and a second perforated mask each having holes respectively which are opposite to one another, vapor depositing a gaseous doping agent through said holes and thus forming heavily doped regions on said faces, metallizing said heavily doped regions through said masks, replacing said first mask by a third mask having holes larger than and concentric to said metallized heavily doped regions, replacing said second mask by a perforated electrode having holes equal to and opposite the holes of said third mask, depositing an insulating film through the holes of said third mask and through the holes of said electrode on the surface of and surrounding said metallized heavily doped regions, removing said third mask and embedding said electrode and the lateral wall of the slice with an insulating material, etching the slice thus prepared which results in rods perpendicular to the slice, electro-plating a gate electrode, dissolving the insulating material and the insulating film, and soldering one electrode on the plane face of the slice and another electrode on the ends of the rods.

7. A method of manufacturing high power field-effect transistors comprising covering the faces of a semi-conductive parallel face slice with a first and a second perforated masks each having holes respectively which are opposite to one another, vapor depositing a gaseous doping agent through said holes and thus forming heavily doped regions on said faces, metallizing said heavily doped regions through said holes, replacing said first mask by a third mask having holes larger than and concentric to said metallized heavily doped regions, replacing said second mask by a perforated electrode having holes equal to and opposite the holes of said third mask, depositing a first insulating film through the holes of said third mask and through the holes of said electrode on the surface of and surrounding said metallized heavily doped regions, removing said third mask and embedding said electrode and the lateral wall of the slice with an insulating material, etching the slice thus prepared which results in rods perpendicular to the slice, vapor depositing a second insulating film on the recess and lateral wall of the rods, vaporizing a metal layer over said second insulating film, dissolving the insulating material and the first insulating film, and soldering one electrode on the plane face of the slice and another electrode on the ends of the rods.

8. A method of manufacturing high power field-effect transistors comprising covering the faces of a semi-conductive parallel face slice with two perforated masks each having holes respectively which are opposite to one another, vapor depositing a gaseous doping agent through said holes and thus forming heavily doped regions on said faces, metallizing said heavily doped regions, removing said masks and replacing one of them with a metallic stamp having holes larger than and concentric to said metallized heavily doped regions, placing the semi-conductive slice and the stamp in an ultrasonic device, the slice and the stamp being respectively secured to the fixed and vibrating parts of said device which results in the formation of rods perpendicular to the slice, removing said stamp and embedding the plane face and the lateral wall of the slice with an insulating material, electroplating a gate electrode, dissolving the insulating material and soldering one electrode on the plane face of the slice and another electrode on the ends of the rods.

9. A method of manufacturing high power field-effect transistors comprising covering the faces of a semi-conductive parallel face slice with two perforated masks each having holes respectively which are opposite to one another, vaporizing a gaseous doping agent through said holes and thus forming heavily doped regions on said faces, metallizing said heavily doped regions, removing said masks and replacing one of them by a metallic stamp having holes larger than and concentric to said metallized heavily doped regions, placing the semi-conductive slice and the stamp in an ultrasonic device, the slice and the stamp being respectively secured to the fixed and vibrating parts of said device which results in the formation of rods perpendicular to the slice, removing said stamp and embedding the plane face and the lateral wall of the slice with an insulating material, vapor depositing an insulating film on the recesses and lateral wall of the rods, vapor depositing a metal layer over said insulating film, dissolving the insulating material and soldering one electrode on the plane face of the slice and another electrode on the ends of the rods.

10. A method of manufacturing high power field-effect transistors comprising covering the faces of a semi-conductive parallel face slice with two perforated masks having respectively holes opposite one another, vapor depositing a gaseous doping agent through said holes and thus forming heavily doped regions on said faces, metallizing said heavily doped regions, removing said masks and replacing one of said masks by a metallic stamp having holes larger than and concentric to said metallized heavy doped regions, placing the semi-conductive slice and the stamp in an ultrasonic device, the slice and the stamp being respectively secured to the fixed and vibrating parts of said device which results in rods perpendicular to the slice, removing said stamp, soldering one electrode on the plane face of the slice and another electrode on the ends of the rods, embedding the two electrodes, the lateral wall of the slice and the rods with the exception of small portions of the latter with an insulating material, etching said unembedded portions, electroplating a gate electrode on said etched portions and dissolving the insulating material.

11. A method of manufacturing high power field-effect transistors comprising covering the faces of a semi-conductive slice having parallel faces with a first and a second perforated mask each having holes respectively which are opposite to one another, vapor depositing a gaseous doping agent through said holes and thus forming heavily doped regions on said faces, metallizing said heavily doped regions through said masks, replacing said first mask by a third mask having holes larger than and concentric to said metallized heavily doped regions, replacing said second mask by a perforated electrode having holes equal to and opposite the holes of said third mask, depositing an insulating film through the holes of said third mask and through the holes of said electrode on the surface of and surrounding said metallized heavily doped regions, removing said third mask and embedding said electrode and the lateral wall of the slice with an insulating material, etching the slice thus prepared which results in rods perpendicular to the slice, electroplating a gate electrode and dissolving the insulating material and the insulating film.

References Cited in the file of this patent

UNITED STATES PATENTS

| | | |
|---|---|---|
| 2,679,619 | Grassl | May 25, 1954 |
| 2,689,930 | Hall | Sept. 21, 1954 |
| 2,784,479 | Roberts | Mar. 12, 1957 |
| 2,814,853 | Paskell | Dec. 3, 1957 |